(12) United States Patent
Frauhammer et al.

(10) Patent No.: US 7,644,929 B2
(45) Date of Patent: Jan. 12, 2010

(54) HAND-HELD POWER TOOL WITH A REPLACEABLE TOOL FITTING

(75) Inventors: Karl Frauhammer, Leinfelden-Echterdingen (DE); Otto Baumann, Leinfelden-Echterdingen (DE); Rolf Mueller, Leinfelden-Echterdingen (DE); Heinz Schnerring, Dettenhausen (DE); Dietmar Saur, Gomaringen (DE); Willy Braun, Neustetten (DE); Axel Kuhnle, Freiberg A. N. (DE); Thomas Bernhardt, Aichtal-Groetzingen (DE); Uwe Engelfried, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 10/579,959

(22) PCT Filed: Jul. 1, 2005

(86) PCT No.: PCT/EP2005/053126

§ 371 (c)(1),
(2), (4) Date: May 19, 2006

(87) PCT Pub. No.: WO2006/024565

PCT Pub. Date: Mar. 9, 2006

(65) Prior Publication Data

US 2007/0096404 A1 May 3, 2007

(30) Foreign Application Priority Data

Sep. 2, 2004 (DE) ........................ 10 2004 042 465

(51) Int. Cl.
*B23B 31/22* (2006.01)

(52) U.S. Cl. .......................... 279/19.4; 279/22; 279/75; 279/905

(58) Field of Classification Search ....... 279/19.1–19.7, 279/76, 81, 82, 904, 75, 905, 22, 30, 14, 279/89, 93, 94; 173/13, 15, 29; B23B 31/22
See application file for complete search history.

(56) References Cited

U.S. PATENT DOCUMENTS 5,199,833 A * 4/1993 Fehrle et al. ............ 408/239 R (Continued)

FOREIGN PATENT DOCUMENTS

DE 196 21 610 12/1997

(Continued)

*Primary Examiner*—Eric A Gates
(74) *Attorney, Agent, or Firm*—Michael J. Striker

(57) ABSTRACT

A very easy-to-actuate, replaceable tool fitting is comprised in that at least one movably supported profiled body (15) on an output spindle (1) or on the tool fitting (11) of the hand-held power tool and at least one profiled recess (7) on the output spindle (1) or on the tool fitting (11) are shaped and situated in such a way that when the tool fitting (11) is slid onto the output spindle (1), the at least one profiled body (15) engages in detent fashion in the at least one profiled recess (7), achieving both an axial locking and a rotary driving of the tool fitting (11) in relation to the output spindle (1) and means (6, 8, 14) are provided, which, through a rotating and sliding motion of the tool fitting (11) on the output spindle (1), guide the profiled body (15) into the profiled recess (7).

8 Claims, 4 Drawing Sheets

U.S. PATENT DOCUMENTS

| | | |
|---|---|---|
| 6,536,780 B2 * 3/2003 | Baumann et al. | 279/19.4 |
| 7,137,457 B2 * 11/2006 | Frauhammer et al. | 173/29 |
| 7,258,349 B2 * 8/2007 | Frauhammer et al. | 279/19 |
| 7,360,606 B2 * 4/2008 | Saur et al. | 173/29 |
| 2003/0188877 A1 10/2003 | Saur et al. | |

FOREIGN PATENT DOCUMENTS

| | | |
|---|---|---|
| DE | 100 05 910 | 8/2001 |
| DE | 100 47 021 | 4/2002 |
| EP | 0 556 713 | 8/1993 |
| FR | 1 424 002 | 1/1966 |
| GB | 2 313 566 | 12/1997 |

* cited by examiner

HAND-HELD POWER TOOL WITH A REPLACEABLE TOOL FITTING

CROSS-REFERENCE TO RELATED APPLICATION

The invention described and claimed hereinbelow is also described in German Patent Application DE 10 2004 042 465.9 filed on Sep. 2, 2004. This German Patent Application provides the basis for a claim of priority of invention under 35 U.S.C. 119(a)-(d).

BACKGROUND OF THE INVENTION

There is a need for a hand-held power tool, for example a rotary drill, with a tool fitting that can be quickly and easily replaced. It ought to be possible either to change between two different tool fittings or to exchange a worn tool fitting for a new one. These tool fittings can be for drill bits and chisels used for impact drilling and chiseling in stone or they can be for screwdriving and non-impact drilling in steel and wood. Tools with system insert ends (e.g. SDS-plus) or with round or hexagonal insert ends can be inserted into the tool fittings.

A hand-held power tool with a replaceable tool fitting is known, for example, from DE 196 21 610 A1. In it, the output spindle onto which the tool fitting can be placed has a number of profiled bodies and the tool fitting is provided with profiled recesses into which the profiled bodies can engage in detent fashion, thus securing the tool fitting axially in relation to the output spindle. The rotary drive between the output spindle and the tool fitting is achieved by providing both parts with teeth that engage with one another. No actuation sleeve is required to place the tool fitting onto the output spindle. For the detent engagement of the tool fitting on the output spindle, care must be taken that the tool fitting is slid onto the output spindle at the correct rotation angle so that the profiled bodies find the profile recesses associated with them. This makes it more difficult to mount the tool fitting onto the hand-held power tool.

SUMMARY OF THE INVENTION

The object of the present invention is to embody the tool fitting and the output spindle so as to make it very easy to mount the tool fitting onto the hand-held power tool. When the hand-held power tool with replaceable tool fitting is designed in accordance with the present invention, it does not matter what rotation angle at which the tool fitting is mounted onto the machine. Despite this fact, the tool fitting finds its own way into the correct position for the detent engagement.

DESCRIPTION OF THE PREFERRED EMBODIMENTS

Figure 1:
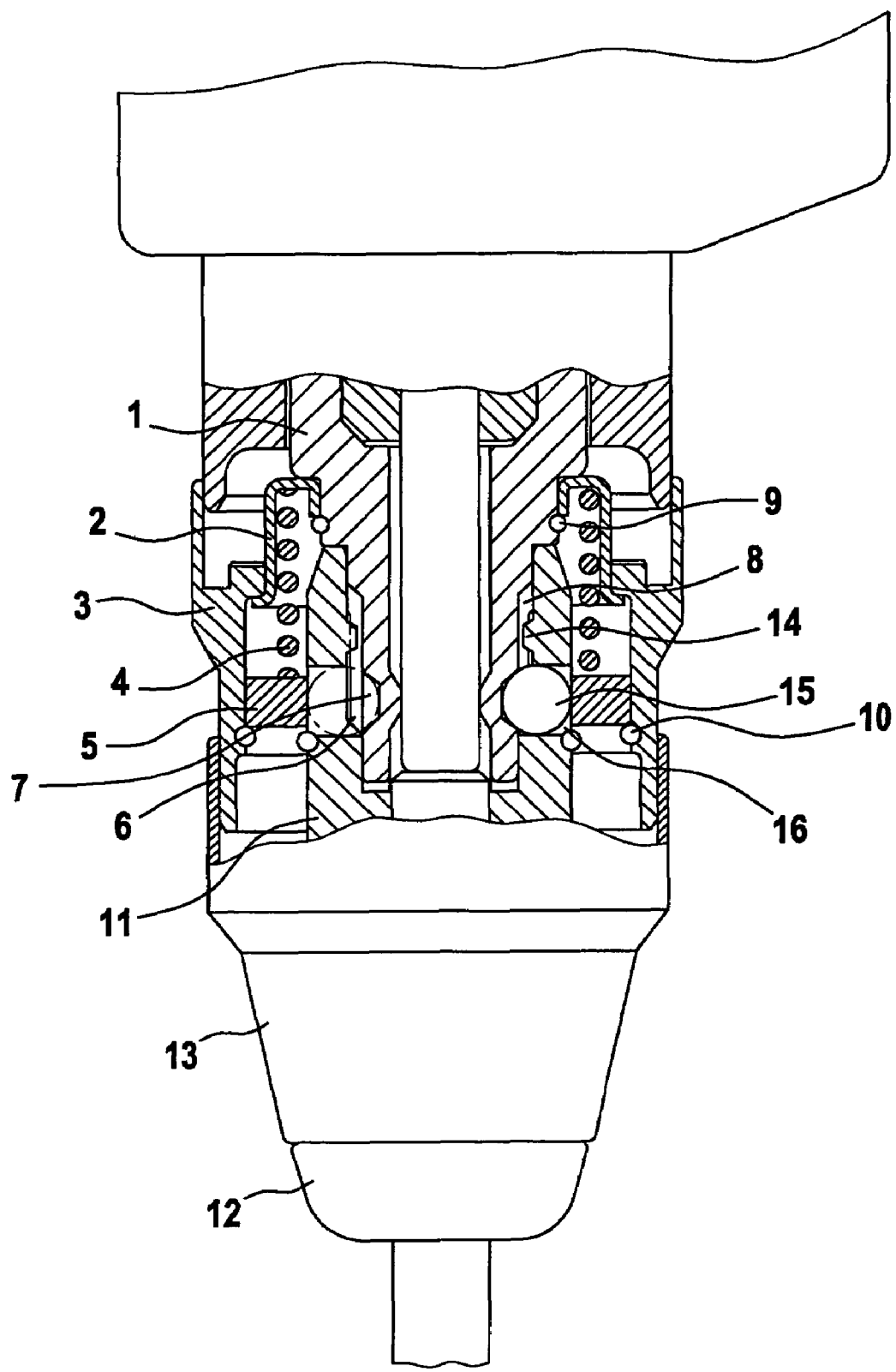
FIGS. 1-4 are views showing a tool fitting in various stages of its being slid onto a hand-held power tool.

As depicted in FIG. 1, the hand-held power tool, for example a rotary hammer, and the tool fitting that can be mounted onto it are embodied as follows: the rotary hammer has an output spindle 1—embodied here in the form of a hammer tube 1, a receiving sleeve 2, a release sleeve 3, a compression spring 4, and a support ring 5. The hammer tube 1 has one or more profiled recesses 7 distributed over its circumference and one or more grooves 8 distributed over its circumference. The receiving sleeve 2, the release sleeve 3, the compression spring 4, the support ring 5, and a safety ring 10 for the support ring 5 can be embodied in the form of a preassembled unit that can be attached to the hammer tube 1 by means of a securing mechanism 9.

The compression spring 4 and a securing ring 10 hold the release sleeve 3 and the support ring 5 on the receiving sleeve 2 in an axially sliding fashion. In addition to the above-mentioned elements, the tool fitting 11 has a dust protection cap 12, a protective sleeve 13, one or more fastening profiles 14 distributed over the circumference, and one or more profiled bodies 15 distributed over the circumference, which in the present exemplary embodiment, are embodied in the form of balls 15.

The profiled bodies 15 are supported in radially moving fashion in openings 16 in the tubular tool fitting 11 that can be slid onto the hammer tube 1. The shape of the profiled recesses 7 let into the hammer tube 1 is adapted to the shape of the profiled bodies 15 so that the profiled bodies 15 fit into the profiled recesses 7.

The mounting of the tool fitting 11 onto the rotary drill is described below.

Figure 2:
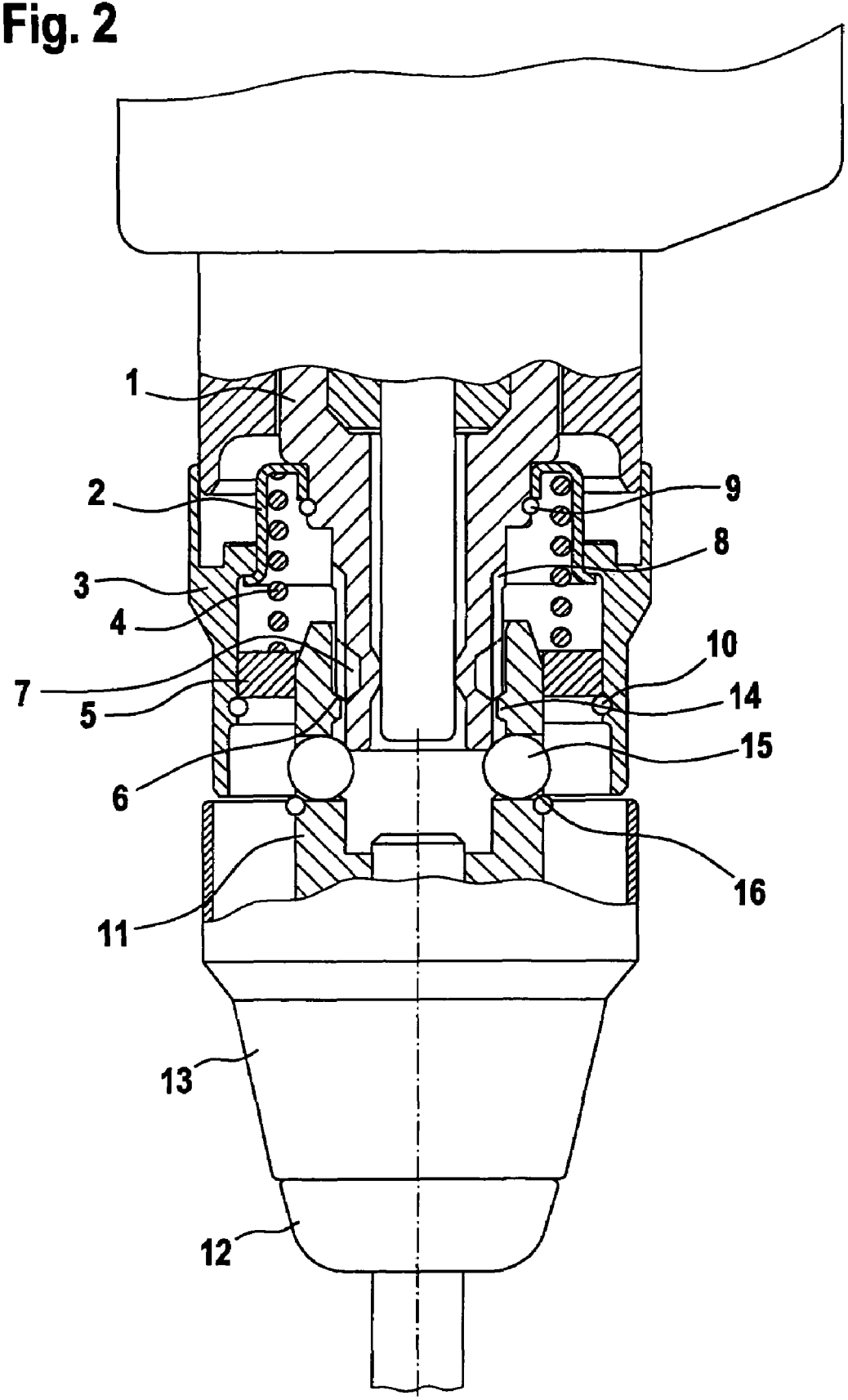

The tool fitting 11 is slid onto the hammer tube 1 until the at least one fastening profile 14 strikes against the shoulder 6 (see FIG. 2).

The tool fitting 11 is rotated until the at least one fastening profile 14, sliding along the shoulder 6, engages in the at least one groove 8. The groove 8 is widened at its entry in order to facilitate insertion of the fastening profile 14. For example, the fastening profile 14 is a lug-shaped projection formed onto the inside of the tubular tool fitting 11.

Figure 3:
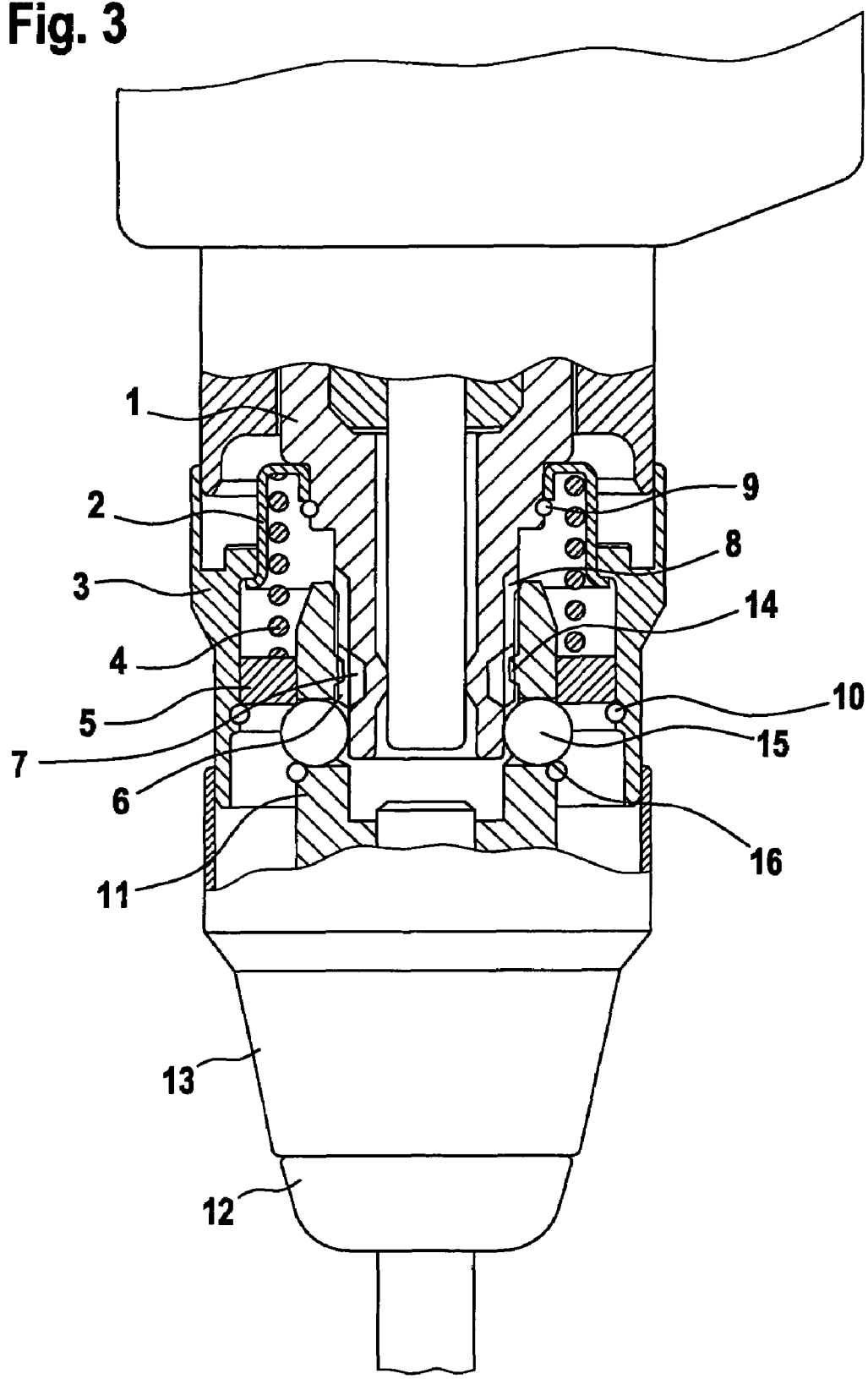
Figure 4:
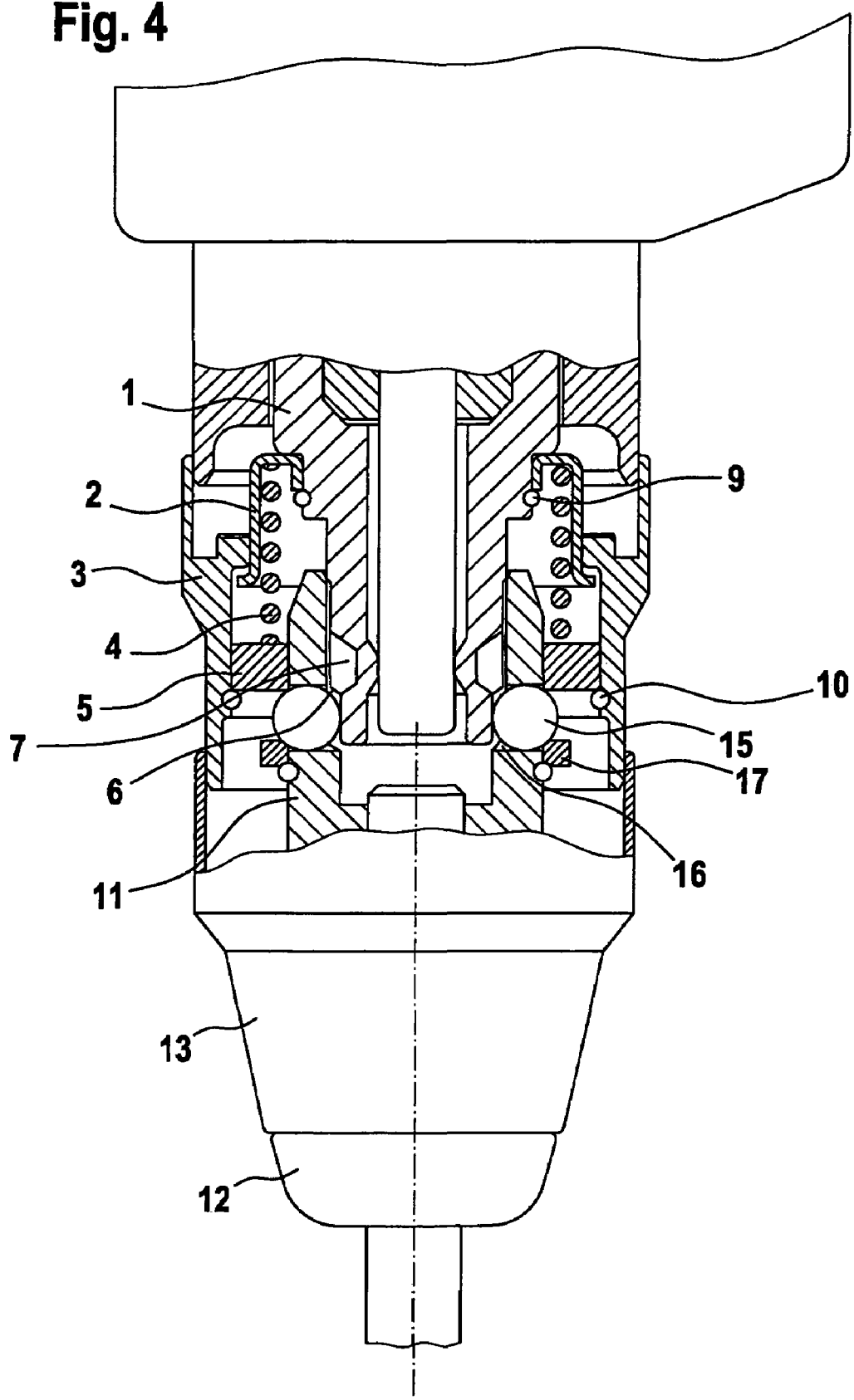

While the fastening profile 14 is traveling into the groove 8, it is possible for the tool fitting 11 to slide further, causing the at least one ball 15 to come into contact with the support ring 5 (see FIG. 3).

As the tool fitting 11 is slid further, the at least one ball 15 slides the support ring 5 counter to the force of the compression spring 4 until the at least one ball 15 can travel into the profiled recess 7 (calotte).

As soon as the at least one ball 15 travels into the profiled recess 7, the compression spring 4 slides the support ring 5 over the at least one ball 15.

The at least one ball 15 acts as a rotary drive and serves to axially fix the tool fitting 11 in relation to the hammer tube 1 of the rotary hammer.

The means—fastening profile 14, profiled body 15—provided on the tool fitting 11 in the exemplary embodiment shown and the means—profiled recess 7, groove 8—provided on the hammer tube 1 of the hand-held power tool can also be swapped, namely the means on the tool fitting 11 can be provided on the hammer tube 1 and vice versa.

The above-described mounting of the tool fitting 11 onto the hammer tube 1 of the rotary hammer requires no actuation of the release sleeve 3. The low level of friction between the at least one fastening profile 14 on the tool fitting 11 and the shoulder 6 on the hammer tube 1 assures the engagement of the fastening profile 14 into the groove 8 despite the fact that the dust protection cap 12 and the protective sleeve 13 can rotate in relation to the tool fitting 11.

The above-described replaceable tool fitting has the following advantages: the rotary drive and axial fixing of the replaceable tool fitting 11 in relation to the hammer tube 1 of the rotary hammer occurs only by means of at least one ball 15, an associated opening 16, and a profiled recess 7 in the hammer tube 1. The tool fitting 11 can be slid onto the rotary hammer without having to actuate the release sleeve 3. The very low level of friction between the at least one fastening profile 14 on the tool fitting 11 and the shoulder 6 on the hammer tube 1 permits the protective cap 12, the protective sleeve 13, and the release ring 3 to be embodied as rotatable so that there is no danger of injury if the user inadvertently comes into contact or grasps these parts. Because the above-mentioned parts are rotatable, they also cannot be damaged by abrasion when they scrape against a work piece or a wall. Because the friction between the fastening profile 14 and the shoulder 6 of the hammer tube 1 is less than the rotation resistance of the protective cap 12 and the protective sleeve 13, the tool fitting can be engaged in detent fashion in its locking position by rotating and sliding the protective cap 12 and the protective sleeve 13.

The at least one profiled recess 7 and the at least one groove 8 can be situated in axial series with each other or offset from each other on the hammer tube 1. Situating them in axial series with each other has the advantage that the same tool can be used to produce the at least one ball recess 7 and the at least one groove 8. In conjunction with this, the at least one opening 16 and the at least one fastening profile 14 on the tool fitting 11 are likewise situated in axial series with each other or offset from each other.

The removal of the tool fitting 11 from the rotary hammer occurs as follows: the release sleeve 3 is pulled toward the rotary hammer, which causes the securing ring 10 to slide the support ring 5, releasing the at least one ball so that it can come out of the ball recess 7, after which the tool fitting 11 can be removed.

What is claimed is:

1. A hand-held power tool, comprising two components including an output spindle (1) and a replaceable tool fitting (11); at least one movably supported profiled element (15) formed or situated on one of the components at least one profiled recess (7) formed or situated on the other of the components in a manner such that, when the tool fitting (11) is slid onto the output spindle (1), the at least one profiled element (15) engages in the at least one profiled recess (7), thereby locking the tool fitting (11) on the output spindle (1) in the axial direction and ensuring that it is driven in a rotational manner; means (6, 8, 14,) guiding the profiled element (15) into the profiled recess (7) when the tool fitting (11) performs a rotational and sliding motion on the output spindle (1) and including a radially encircling projection (6) provided on the one component, at least one "rotate-into-engagement profile" (14) provided on the other component, which is configured to glide along the projection (6), and which impacts the projection (6) when the tool fitting (11) is inserted onto the output spindle (1), the projection (6) including an interruption—which leads into a groove (8) for each of the "rotate-into-engagement profiles" (14), at least one "rotate-into-engagement profile" (14) and the associated groove (8) being situated relative to the at least one profiled element (15) and the associated profiled recess (7) in a manner such that, when the "rotate-into-engagement profile" (14) glides into the associated groove (8), the profiled element (15) is guided into the associated profiled recess (7).

2. The hand-held power tool as recited in claim 1, wherein the at least one groove (8) is situated in series before or after the at least one profiled recess (7) in the direction of the longitudinal axis of the output spindle (1).

3. The hand-held power tool as recited in claim 1, wherein the profiled recess (7) constitutes the entry for the groove (8), which entry constitutes the break in the shoulder (6).

4. The hand-held power tool as recited in claim 3, wherein the profiled recess (7) constitutes an entry for the groove (8), which entry is widened in relation to the dimensions of the fastening profile (14).

5. The hand-held power tool as recited in claim 1, wherein the at least one groove (8) is situated offset from the at least one profiled recess (7) in the circumference direction of the output spindle (1).

6. The hand-held power tool as recited in claim 1, wherein the fastening profile (14) is radially protruding projection formed onto the tool fitting (11) or the output spindle (1).

7. The hand-held power tool recited in claim 1, wherein a support ring (5) is provided, which is a supported in sprung fashion in the direction of the longitudinal axis of the tool fitting (11), is slid by the at least one profiled body (15) when the tool fitting (11) is being slid onto the output spindle (1), and covers the at least one profiled body (156) when the latter is engaged in its profiled recess (7).

8. The hand-held power tool as recited in claim 7, wherein a release sleeve (3) is provided, which is able to side the support ring (5) so that the at least one profiled body (15) is able to come out of its profiled recess (7).

* * * * *